July 25, 1961    C. A. MILLS    2,993,346
CHILLING AND FREEZING SYSTEMS
Filed March 18, 1960

INVENTOR.
CLARENCE A. MILLS,
BY
ATTORNEYS.

United States Patent Office 2,993,346
Patented July 25, 1961

2,993,346
CHILLING AND FREEZING SYSTEMS
Clarence A. Mills, Cincinnati, Ohio, assignor to Reflectotherm, Inc., Cincinnati, Ohio, a corporation of Ohio
Filed Mar. 18, 1960, Ser. No. 16,011
4 Claims. (Cl. 62—64)

My invention relates to chilling and freezing systems and particularly to such systems involving chilling and freezing of food products such as meats.

In my copending application, Serial No. 16,010, filed March 18, 1960, I have disclosed a cooling and freezing system in which the food products to be chilled or frozen are carried on a conveyor between cold plates coated with amorphous carbon blacked surfaces and in which the cold plates and food products are either in a submerged bath of antifreeze solution or are sprayed with such a solution, the low temperature of the solution being maintained by circulation through a freezing unit at about 0° F.

It is my object in the system disclosed in this application to combine the cold plate with the polyethylene bagging enclosing the food products by wrapping or enclosing the food products to be chilled or frozen in a bagging material of plastic, preferably polyethylene which contains as part of its make up, amorphous carbon. This obviates the necessity of auxiliary cold plates since the amorphous carbon forms part of the polyethylene bagging.

By subjecting the bagged material to an antifreeze spray maintained at a substantially constant low level, it has been my experience that all radiant rays emitted are intercepted by the bagging material and a spray of low temperature controlled anti-freeze solution takes up the heat from the bagging by direct conduction.

For illustrative purposes I have shown in the drawings.

Figure 1:
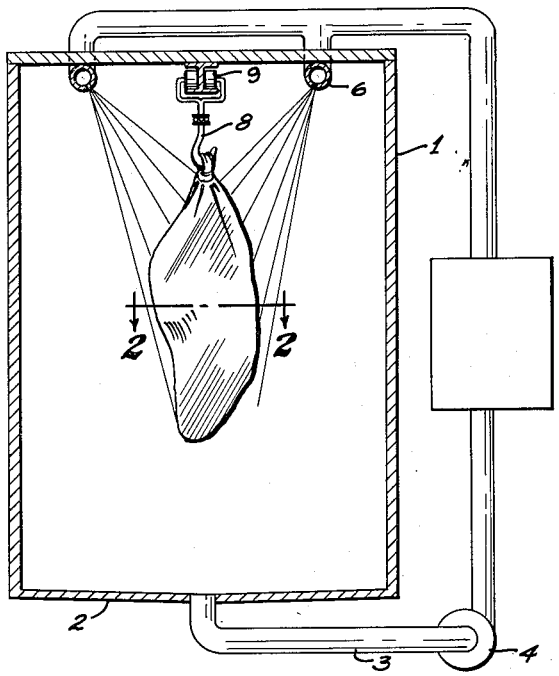
FIGURE 1 is a diagrammatic showing of a freezing conveyor with a hunk of bagged meat being sprayed.

The conveyor diagrammatically indicated has enclosing walls 1 and bottom wall 2 from which a discharge pipe 3 leads to a pump 4 which pumps to a freezing unit 5 from which the antifreeze liquid, maintained at a substantially constant low temperature of about 0° F. is sprayed through the spray nozzle 6 against the hunk of meat 7 carried on the suspension hook 8 of a continuous conveyor 9.

Figure 2:
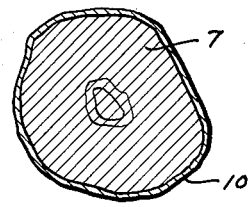
FIGURE 2 is a sectional view of the hunk of meat enwrapped in polyethylene containing amorphous carbon.
Figure 3:
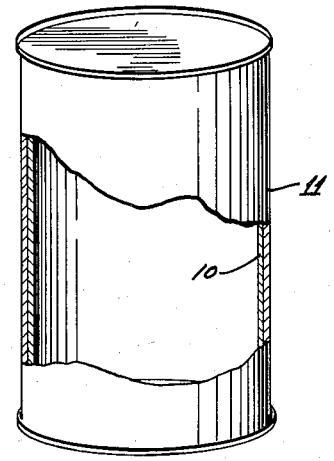
FIGURE 3 is a view of a container with parts in section showing the use of a polyethylene coating containing amorhpous carbon as an inner liner for the container which may be chilled by spraying with an antifreeze solution such as is indicated in FIGURE 1.

FIGURE 2 shows the hunk of meat 7 closely wrapped in the plastic wrapping 10 which has amorphous carbon incorporated in its structure. FIGURE 3 shows a container 11 having its inner walls coated with a plastic such as polyethylene 10 also having amorphous carbon incorporated in its structure.

A suitable wrapping material or sheeting having an adequate volume of pulverulent amorphous carbon incorporated in its structure is made and sold under the trademark Vis Queen by the Plastics Division of the Visking Corporation, a division of Union Carbide Corporation at Terre Haute, Indiana. It is made in various thicknesses. I have found that a material of .004 in. thickness in which 1000 sq. ft. weighs under 20 pounds. This material is sold for outdoor storage covers for lumber and millwork, plasterboard, cement, plaster, doors, and equipment and haystack covers. The material is rot and mildew proof and is unaffected by acids, alkalies and caustics.

This material or its equivalent has, as far as I am advised, never been used in any combination in a refrigerating system for wrapping articles to be frozen, and I claim its use broadly herein for such purposes.

While I have specified polyethylene as the preferred type of sheeting with amorphous carbon incorporated in its structure, other plastic materials may be used to serve the same purposes, such as cellophone, nylon and other plastic sheeting.

In FIGURE 3 the container has the plastic including the amorphous carbon in its structure coated on its interior walls. To reduce the temperature of any liquid being frozen or solidified in the container, such as lard compound, it is merely necessary to place the container within the enclosing walls 1 and spray the outside of the container with the chilled antifreeze solution.

Having thus described my invention, what I claim as new and desire to secure by Letters Patent is:

1. A method of chilling food products which consists in surrounding the food products with a covering of plastic sheeting which has uniformly incorporated in its structure sufficient flat carbon black particles to render said covering receptive to but non-permeable by infrared radiant rays, spraying said covered food products with a solution chilled to about 0° F. and withdrawing said sprayed water and recirculating it through refrigeration apparatus to maintain its cooling capacity by conduction at substantially the 0° F. temperature.

2. A method of chilling food products which consists in surrounding the food product with a covering of plastic sheeting which has uniformly incorporated in its structure sufficient flat carbon black particles to render said covering receptive to but non-permeable by infrared radiant rays, spraying said covered food products with a solution chilled to about 0° F. and withdrawing said sprayed water and recirculating it through refrigeration apparatus to maintain its cooling capacity by conduction at substantially the 0° F. temperature, said plastic sheeting consisting in polyethylene.

3. A method of freezing a food product which consists in wrapping the food product in a plastic sheeting which has amorphous carbon uniformly incorporated in its structure and spraying the wrapped food product with an antifreeze solution maintained at a temperature materially below the freezing temperature of the food product.

4. A method of freezing a food product which consists in wrapping the food product in a polyethylene sheeting which has amorphous carbon uniformly incorporated in its structure and spraying the wrapped food product with an antifreeze solution maintained at a temperature materially below the freezing temperature of the food product.

References Cited in the file of this patent
UNITED STATES PATENTS

| | | |
|---|---|---|
| 2,286,225 | Noyes | June 16, 1942 |
| 2,759,830 | Touceda | Aug. 21, 1956 |
| 2,912,336 | Perino | Nov. 10, 1959 |